(12) United States Patent
Boss et al.

(10) Patent No.: US 10,496,945 B2
(45) Date of Patent: Dec. 3, 2019

(54) ONLINE GLOBAL PLANNING SYSTEM FOR INTERNATIONAL THEATER POST PRODUCTION AND ENTERPRISE OPERATIONS

(71) Applicant: Fox Digital Enterprises, Inc., Los Angeles, CA (US)

(72) Inventors: Garrett Vincent-McKay Boss, Hermosa Beach, CA (US); Giles A. Pretty, La Crescenta, CA (US); Jennie P. Ho, Sherman Oaks, CA (US); Nikolaus Kelly Ward, Los Angeles, CA (US); Niravkumar G. Majmudar, Rolling Hills Estates, CA (US)

(73) Assignee: FOX Digital Enterprises, Inc., Los Angeles, CA (US)

( * ) Notice: Subject to any disclaimer, the term of this patent is extended or adjusted under 35 U.S.C. 154(b) by 1129 days.

(21) Appl. No.: 14/742,568

(22) Filed: Jun. 17, 2015

(65) Prior Publication Data
US 2015/0363718 A1    Dec. 17, 2015

Related U.S. Application Data

(60) Provisional application No. 62/013,470, filed on Jun. 17, 2014.

(51) Int. Cl.
*G06Q 10/06* (2012.01)

(52) U.S. Cl.
CPC ................. *G06Q 10/0633* (2013.01)

(58) Field of Classification Search
USPC ........................................ 707/634
See application file for complete search history.

(56) References Cited

U.S. PATENT DOCUMENTS

| | | | | |
|---|---|---|---|---|
| 2012/0330644 | A1* | 12/2012 | Giraudy et al. | G06F 17/28 704/3 |
| 2014/0258268 | A1* | 9/2014 | Woods | G06F 17/30 707/722 |
| 2014/0278360 | A1* | 9/2014 | Clark et al. | G06F 17/27 704/9 |
| 2015/0089530 | A1* | 3/2015 | Abele | H04N 21/4884 725/25 |

* cited by examiner

*Primary Examiner* — Muluemebet Gurmu
(74) *Attorney, Agent, or Firm* — Farjami & Farjami LLP

(57) ABSTRACT

A method, apparatus, system, computer program product, and online collaboration tool provide the ability to track a theatrical media content asset in post-production. A title for the theatrical media content asset is initiated in an online global planning system by creating one or more archival versions. Each of the archival versions represents a cut of the theatrical media content asset that is stored in a vault. A presentation version, that is based on a single unique archival version, is created and represents a localized version of the single unique archival version. Areas of the archival version that are required for localization are identified. Requests to release the presentation version are managed and processed. Milestones representing events that are or have been performed on the title are created, and the completion statuses of the milestones are tracked.

20 Claims, 10 Drawing Sheets

Original Version: Good Day to Die Hard-cv ▼ — 302

Master Cuts / Edits — 304

| Censor # ▲ | Filename 308 | Reel # | Frame In | Frames Deleted | Frames Inserted | Description |
|---|---|---|---|---|---|---|
| 165 | Singapore/India Censored Cut 10 | Reel 4 | 03:37:08 | 00:00:04 | 00:00:04 | Reel 4 Alter Audio:(JACK TO SELF) |
| 164 | Singapore/India Censored Cut 9 | Reel 4 | 02:28:00 | 00:00:14 | 00:00:14 | Reel 4 Alter Audio: JACK TO MCCLANE) killing bad guys. |
| 163 | Singapore/India Censored Cut 8 | Reel 3 | 09:06:30 | 00:00:08 | 00:00:08 | Reel 3 Alter Audio: So, I now need that file to run this mission. |
| 162 | Singapore/India Censored Cut 6 | Reel 3 | 06:26:16 | 00:00:07 | 00:00:07 | Reel 3 Alter Audio: JACK TO MCCLANE |
| 161 | Singapore/India Censored Cut 5 | Reel 3 | 01:16:16 | 00:00:05 | 00:00:05 | Reel 3 Alter Audio: (JACK TO MCCLANE): Jack, what the was that, huh? |
| 160 | Singapore/India Censored Cut 4 | Reel 2 | 15:17:08 | 00:00:13 | 00:00:13 | Reel 2 Alter Audio: (MCCLANE TO SELF): You gotta be kidding me ! |
| 159 | Singapore/India Censored Cut 3 | Reel 2 | 12:38:00 | 00:00:09 | 00:00:09 | Reel 2 Alter Audio: ALIK TO SELF):Oh, |
| 158 | Singapore/India Censored Cut 2 | Reel 2 | 10:22:16 | 00:00:11 | 00:00:11 | Reel 2 Alter Audio: MCCLANE TO MRAP DRIVER): what the do you thin |
| 157 | Singapore/India Censored Cut 1 | Reel 2 | 09:44:00 | 00:00:05 | 00:00:05 | Reel 2 Alter Audio: MCCLANE TO JACK): what the do you think--? |
| 156 | Vietnam/China Censored Cut 1 | Reel 5 | 20:56:19 | 00:02:13 | MM:SS:FF | Reel 5: Removal of the Lennon Statue in the scene |
| 155 | Korea Censored Cut 2 | Reel 5 | 04:09:16 | 00:00:01 | MM:SS:FF | Reel 5 - Scene on rooftop of Chernobyl building Yuri is thrown off the roof |
| 154 | Korea Censored Cut 2 | Reel 5 | 04:09:04 | 00:00:12 | MM:SS:FF | Reel 5 - Scene in Chernobyl safe where Alik is murdered (shot removes do |
| 145 | Korea Censored Cut 1 | Reel 3 | 04:41:14 | 00:01:11 | MM:SS:FF | Reel 3 -- Scene in CIA safe room where Jack's partner is shot (removing rec |
| 0 |  |  | MM:SS:FF | MM:SS:FF | MM:SS:FF |  |

— 306, 310

| Picture | Audio | Base Pkg | Length Chg |
|---|---|---|---|
| Original Picture | New Audio | ☐ |  |
| Original Picture | New Audio | ☐ |  |
| Original Picture | New Audio | ☐ |  |
| Original Picture | New Audio | ☐ |  |
| Original Picture | New Audio | ☐ |  |
| Original Picture | New Audio | ☐ |  |

— 314

Time Format: MM:SS:FF ▼ — 316

Territories — 312

United Kingdom
Australia, Brazil, Czech Republic
Brazil
United Kingdom, South Korea, Spain ☐ South Africa
☑ South Korea
☑ Spain
☐ Sri Lanka
☐ Sweden
☐ Switzerland
☐ Syria
☐ Taiwan
☐ Thailand

| | | Home Office (Fox LA) | | Territory Localization - Subtitles | | |
|---|---|---|---|---|---|---|
| Event ID | Original Version Text/Lyric | Original Language | Recommendation | Comments | Decision | Translation | Comments |
| 10 | MASS PROTESTS IN MOSC | RUSSIAN | | | Subtitle | Des manifestations de masse à Moscou | add in a note |
| 20 | What do you want, Viktor? | RUSSIAN | Subtitle | | | | |
| 30 | Why are you doing this? | RUSSIAN | | | | | |

| | | 510 | | | 512 | | | | | | |
|---|---|---|---|---|---|---|---|---|---|---|---|

Level: [All ▼]  Territory: [All ▼]  Region: [All ▼]  Language: [All ▼]

AV/BP: [None ▼]  Type: [All ▼]  Area: [All ▼]  Status: [Open,Complete ▼]  PV: [   ]

— 514
— 516

All Milestones > [⚙][X]

| # | Description | Region/Territory | Archival Version / Base Package | Dimen | Language | Sound | PV# | Type | End |
|---|---|---|---|---|---|---|---|---|---|
| 40 | Territory Release Date | Slovenia | | | | | | Milestone | Sep-26-2013 |
| 40 | Territory Release Date | Japan | | | | | | Milestone | Jan-24-2014 |
| 40 | Territory Release Date | Czech Republic | | | | | | Milestone | Sep-26-2013 |
| 40 | Territory Release Date | Switzerland | | | | | | Milestone | Sep-25-2013 |
| 40 | Territory Release Date | Hong Kong | | | | | | Milestone | Sep-26-2013 |
| 40 | Territory Release Date | Thailand | | | | | | Milestone | Sep-26-2013 |
| 40 | Territory Release Date | Mexico | | | | | | Milestone | Sep-27-2013 |
| 40 | Territory Release Date | Romania | | | | | | Milestone | Sep-27-2013 |
| 40 | Territory Release Date | Bahrain | | | | | | Milestone | Sep-26-2013 |
| 40 | Territory Release Date | Norway | | | | | | Milestone | Oct-18-2013 |
| 40 | Territory Release Date | Iceland | | | | | | Milestone | Sep-27-2013 |
| 40 | Territory Release Date | Philippines | | | | | | Milestone | Sep-26-2013 |
| 40 | Territory Release Date | New Zealand | | | | | | Milestone | Oct-17-2013 |

FIG. 5B

ONLINE GLOBAL PLANNING SYSTEM FOR INTERNATIONAL THEATER POST PRODUCTION AND ENTERPRISE OPERATIONS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/013,470, filed on Jun. 17, 2014, by Garrett Vincent-McKay Boss, Giles A. Pretty, Jennie P. Ho, Nikolaus Kelly Ward, and Niravkumar G. Majmudar, entitled "Online Global Planning System for International Theater Post Production and Enterprise Operations,".

This application is related to the following commonly-assigned patent application, which application is incorporated by reference herein:

U.S. Patent Application Ser. No. 62/030,503, entitled "Digital Asset Dock (DAD)", by John J. Angelini II, et. al., filed on Jul. 29, 2014.

U.S. Patent Application Ser. No. 62/174,328, entitled "Global Online Digital Asset Management (DAM)", by Garrett V. Boss, et. al., filed on Jun. 11, 2015.

BACKGROUND OF THE INVENTION

1. Field of the Invention

The present invention relates generally to managing media content, and in particular, to a method, apparatus, system, computer program product, and article of manufacture for planning, scheduling, and tracking assets in the presentation version creation process including localization performed for localized versions of the asset.

2. Description of the Related Art

In filmmaking/video production, once a film has completed shooting/filming/recording, various processes (referred to as post production), are performed on the film asset including video and sound editing, adding visual special effects, sound design/effects creation and editing, film transferring/transcoding to a different format, localizing the asset for a foreign release, etc. Further, once a film has been theatrically released (e.g., in a movie theater), further post production processes may be performed to prepare the film for DVD (Digital Video Disc), VOD (Video On Demand), and/or other home release. Such post production processes are performed by a variety of different entities and vendors for a studio for a variety of different countries/regions/territories. Prior art systems fail to provide the capability to efficiently and accurately track an asset upon the completion of filming. Further, prior art systems also fail to provide a system for users/vendors to collaborate and have access to information needed during the post-production phase.

SUMMARY OF THE INVENTION

Embodiments of the invention provide a system referred to as COPPER™ (Collaborate On Product Planning & Enterprise Resources) (also referred to herein as online global planning system). The Copper™ system provides a method, system, and computer program product for tracking an asset through the various stages of film production while providing access to relevant information such that authorized users (including vendors and entities within a studio's production team) can collaborate with each other as necessary.

Assets (i.e., theatrical titles) with a future release date are added to the Copper™ system and tracked as they progress from pre-production, to production, to post-production, to completion. Relevant information regarding such titles are available to authorized users for editing/viewing. Further reports and other information may be generated to enable the appropriate entities to prepare and schedule appropriate personnel/teams to perform the desired workflow process.

BRIEF DESCRIPTION OF THE DRAWINGS

Referring now to the drawings in which like reference numbers represent corresponding parts throughout:

FIG. 3 illustrates an exemplary interface for performing the cuts and edits functionality in accordance with one or more embodiments of the invention;

FIG. 4 illustrates an exemplary graphical user interface that may be used to search for/create a presentation in accordance with one or more embodiments of the invention;

FIG. 5A illustrates a graphical user interface for localizing an event in accordance with one or more embodiments of the invention;

FIG. 5B illustrates a graphical user interface for filtering and viewing milestones in accordance with one or more embodiments of the invention;

DETAILED DESCRIPTION OF THE PREFERRED EMBODIMENTS

Figure 1:
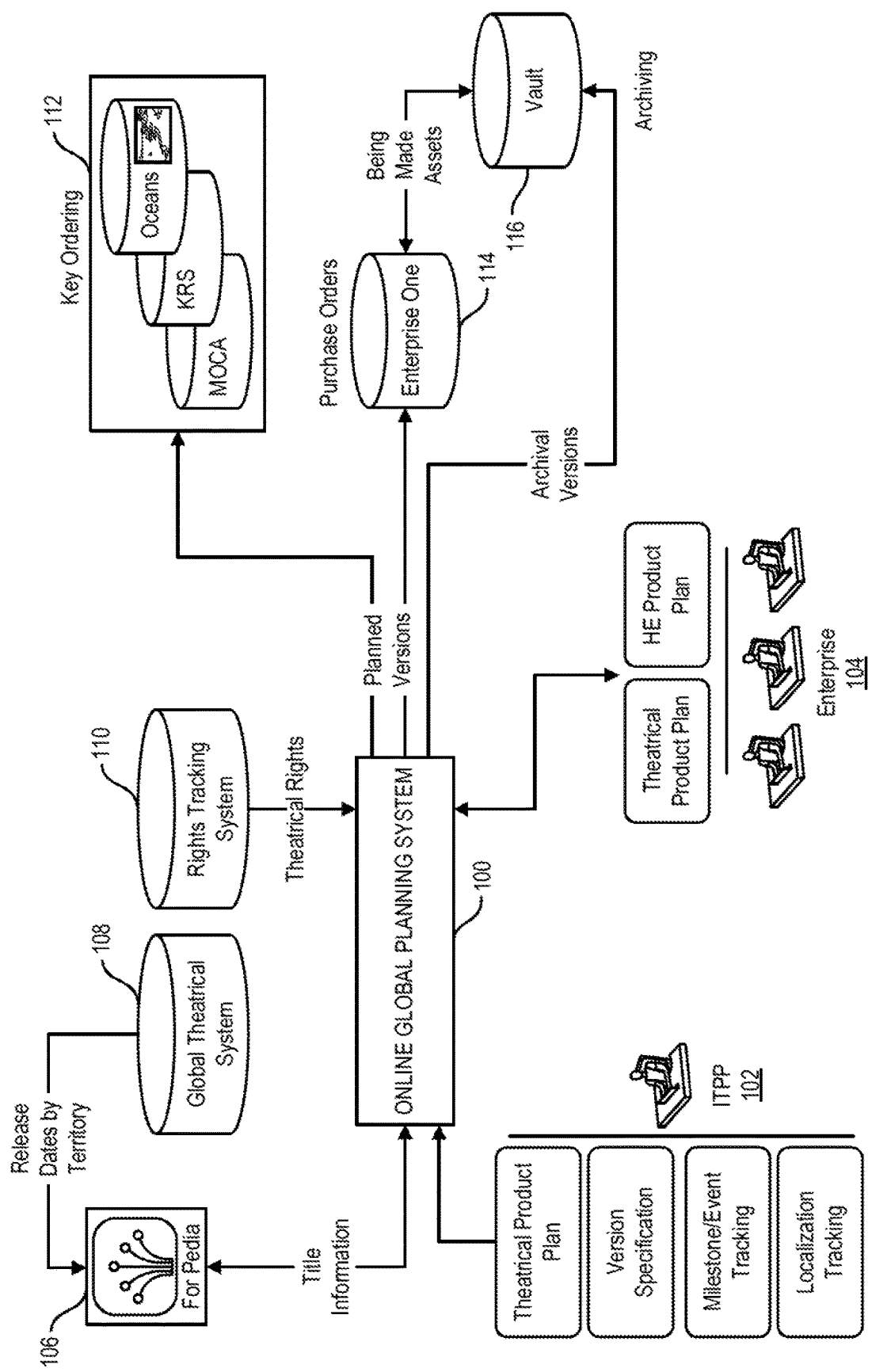
FIG. 1 illustrates an overview of system interaction between the online global planning system and other enterprise management framework components in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Enterprise Media Framework Overview

An Enterprise Media Framework (EMF) provides a system for managing a large volume of media content (e.g., for a studio or other media provider). In particular, the EMF may provide one or more of the following capabilities/features with respect to media content:

a centralized Digital Asset Management (DAM) and repository (in a system referred to as "Esprit");
Search;
Preview;

Download;
Ingest;
Accelerated File Transfer;
Digital Screeners (films/tv);
Broadcast Quality File Delivery (self-service and push);
Annotation/Markup (time-based and non-time based);
Watermark, Digital Rights Management (DRM), etc.

As used herein, the terms media content, media content asset, asset, and content refers to any type of digital media content used for television, film, marketing, etc. In this regard, media content may include audio, text, still photographs, videos, etc. Many types and pieces of information or media content may be utilized as part of the broadcast, advertisement, and sale of such content. Content from various studios (e.g., FOX™) may include:

Over 2,500 Feature Films; over 14,000 Television Series, Seasons and Episodes; and over 1,000 Specials, Movies of the Week and MiniSeries;

Over 100,000 images: Production Stills, Logos, Artwork, Gallery and Episodic Photos;

Over 12,000 Scripts and over 10,000 Music Cue Sheets;

Over 7,300 trailers and other promotional videos;

Over 2,500 episodes for screening;

Over 9,300 broadcast quality files, representing over 700 episodes; and

Over 1,000 broadcast quality promotional videos (Television spots, etc.).

Exemplary formats in which an asset may be created/stored includes MPEG2 (motion pictures expert group version 2), MPEG4, NTSC (national television system committee) 4×3 aspect ratio, 30 fps (frames per second), PAL (phase alternating line) 16×9 aspect ratio at 25 fps, etc. Content may also include television broadcast quality assets, J2K (JPEG 2000) files, etc. Additional assets may include DCP (Digital Cinema Projection) files (i.e., theatrical feature or trailer playouts), DCDM (Digital Cinema Distribution master) files (i.e., post production assets prior to DCP—useful for archiving and may be used for international re-versioning purposes), DSM (Digital Source Master) files (i.e., the original film supplied to an encoding facility), MXF (material eXchange Format), etc. In this regard, media content assets refer to any type of digital representation of media content and/or marketing content for such an asset.

Copper™/Online Global Planning System Overview

As described above, a growing number of territories need to localize a title. Different formats may be required in different territories (e.g., sound formats, film formats, etc.) and different combinations of the formats are utilized and need to be managed. Prior art systems failed to provide a centralized capability to store and access such information.

In concert with the EMF system, embodiments of the invention provide an online-line global planning system (also referred to as Copper™) for the international theatrical post production (ITPP) group and vendors. FIG. 1 illustrates an overview of system interaction between the online global planning system and other enterprise management framework components in accordance with one or more embodiments of the invention. The online global planning system 100 is utilized by a variety of users including the ITPP personnel 102 (to perform/create a theatrical plan, version specification, milestone/event tracking, and localization tracking), and enterprise users 104 (to perform/create a theatrical product plan and an HE [home entertainment] Product Plan).

The ITPP group 102 is the team that handles post-production of a title to prepare the content for theatrical release. The ITPP team/group may have representation in a home office (e.g., in Los Angeles), in one or more regional offices (e.g., London, Sydney, and Mexico City), and various territory offices (e.g., within regions). The ITPP team 102 is responsible for managing the localization and distribution of feature films and trailers in over seventy (70) countries and serves as the source for localized assets for downstream business units. Vendors of the ITPP group 102 may include domestic and international vendor users that provide services including dubbing, mastering, subtitling, recording studios, mixing studios, etc.

The enterprise and/or enterprise operations group 104 (referred to as EO or enterprise ops) includes the home entertainment group, digital EST (electronic sell through) group (download via digital platforms such as iTunes™, Amazon™, etc.), video on demand (VOD) group, etc. that prepare the firm for post-theatrical release via a variety of mediums. In addition, technical services may be provided by various entities (referred to as a tech services team/group) that may perform edits such that the title can play on video/DVD/etc.

The online global planning system 100 improves information sharing within the ITPP group 102, thereby increasing productivity and reducing expediting and rework costs. Across the EO group 104, the online global planning system 100 provides an on-line global product plan for collaboration on territory localization decisions, improves asset visibility between theatrical 102 and enterprise operations 104, and provides a global schedule to track key milestones and deliverables.

As a general overview, the global online planning system 100 provides a portal to access and maintain asset information that may be provided/maintained by a variety of different components. For example, title and other information may be accessed by the online global planning system 100 from an information/title database/enterprise wide data aggregator 106 (e.g., Foxipedia™) that maintains such information (e.g., release dates by territory) about a title. Further, such a data aggregator 106 may provide access to additional data (e.g., territory theatrical release dates maintained within a global theatrical system (GTS) 108).

Theatrical rights (e.g., the theatrical release language rights including rights to distribute a film to a particular territory in a particular version, etc.) may be maintained in a rights tracking system 110 and used by the online global planning system 100. Once localized theatrical versions are planned (e.g., by ITPP group 102 or Enterprise group 104), the key ordering process 112 may be used to track the progress of the localized version development. In other words, the ITPP developed product plan is integrated with the key ordering process to synchronize keys with the asset plans. For example, the KRS system is an international key request system that provides presentation versions to booking systems and Deluxe™ (an entity that provides post production services) to create keys (KDMs [key delivery messages] that include key pairs used to decrypt media files). The MOCA system provides presentation versions of the media content to booking systems for the US, Canada, and Japan, and keys (KDMs) for distribution to theaters. The Oceans™ system is a theatrical booking system used by international theatrical distribution teams for major markets. The Oceans™ theatrical booking system encompasses film sales contracts, key requests, box office tracking, and theater invoicing and accounts receivable.

The Enterprise One™ database is an ERP (enterprise resource planning) system utilized for issuing purchase orders against archival and presentation versions and other assets-in-progress.

Once ordered, the localized archive versions may be made into assets and stored in a vault 116 (e.g., a digital vault library for theatrical archival versions). Further, the different archival versions (in the vault 116) may be tracked and accessed using the online global planning system 100.

As described above, throughout the post production process, theatrical media content may have different forms. The different forms include title, archival versions, and presentation versions. Titles for the media content asset may be initiated in the online global planning system 100 for product planning Such title information may be retrieved from the data aggregator 106 or may be input by one or more users. Metadata associated with title information may include:

- a world product record (WPR) product ID;
- title;
- an alias (AKA, FKA);
- an alias type;
- a security title—a code word determined by the ITTP group for use when referencing the media content (e.g., in email or other correspondence) to limit exposure of the information [e.g. "Temper Trantrum" for "Revenge of the Sith"].
- a studio—for the studio responsible for the media content;
- director;
- cast/talent;
- US release date;
- territory release dates;
- rights (territory/language)(Y/N);
- life cycle status—status of the media content within the production process/cycle;
- competitive release titles—titles of other media content that may be competing with the release of the media content;
- competitive release dates;
- texted language—language of the text/subtitles for the media content;
- synopsis;
- MPAA rating; and
- conformed audio.

Archival versions are cuts of the film that are stored in the vault 116. As an example, for a single title, archival versions may include a domestic version, an international version, a first censorship version (e.g., for the Middle East), a second censorship version (e.g., for India), etc. Metadata associated with archival versions include an archival version ID, image aspect ratio, a flag indicating whether this version is the original version, an online global planning system archival version ID, version type, run time, frame rate, version description, audio channels, dimension, brightness, language, black white/color indicator, version name, and a base package.

Presentation versions are localized (dubs and subtitles) versions in a specified territory and language based on a single unique archival version. Metadata for presentation versions include a presentation version ID, presentation version status, picture format, encryption, closed caption indicator, audio format, hearing impaired audio flag, content type, visually impaired audio flag, non-commercial flag, dimension, dubbed language, subtitle language 1, subtitle language 2, motion control, closed subtitle language, presentation version notes, revision number, territory, aspect ratio, brightness, and open caption.

Figure 2:
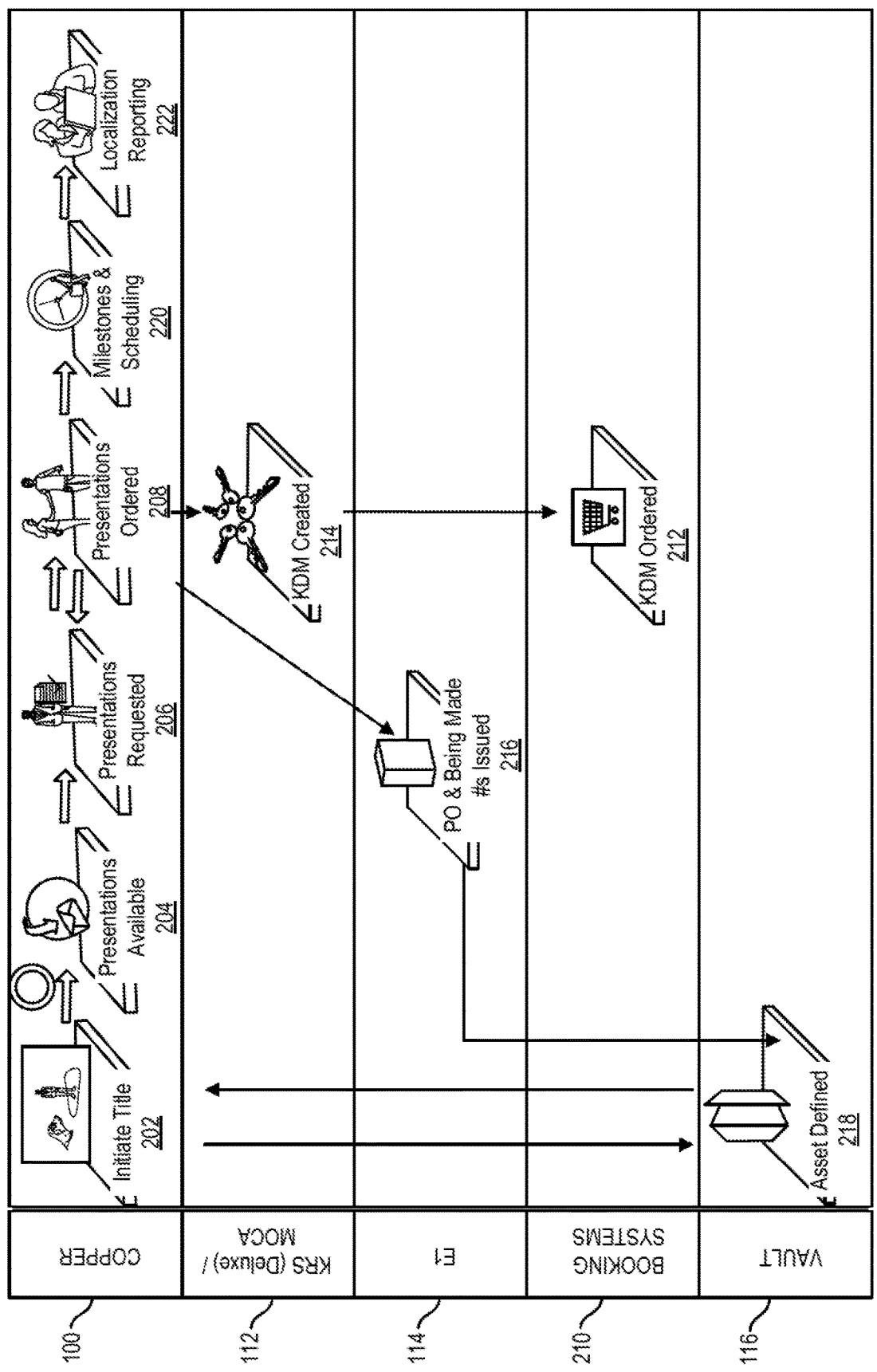
FIG. 2 illustrates the workflow used in the global online planning system in accordance with one or more embodiments of the invention.

FIG. 2 illustrates the workflow used in the global online planning system 100 in accordance with one or more embodiments of the invention. The online global planning system 100 initiates work on the title at step 202. Thereafter, various presentations 204 may be published and/or may be requested at 206. Once a presentation version has been requested and authorized, it may be ordered at 208. The presentation versions may then be provided by the key request system (KRS) (Deluxe™) or MOCA versions/groups 112 to booking systems 210 where keys are ordered at 212 and returned to the KRS 112 at 214. Once created, purchase orders may be issued against the archival and presentation versions, and other "Being Made" assets by the ERP system 114. Once the PO and being made numbers are issued at 216, the asset is defined at 218 (based on the numbers and title information) and placed in the vault 116. Throughout the process, the global online planning system 100 may record/track milestones and scheduling at 220 as well and provide localization reporting at step 222.

In view of the above, through the online global planning system 100, collaboration is improved both within an ITPP group 102 and across enterprise groups 104. In addition, an asset's visibility is increased throughout the asset's lifecycle. In this regard, the planning, purchase order 114, and vault systems 116 are integrated (via the online global planning system 100) to gain visibility for media content "being made" into an asset. In addition to the integration and underlying functionality, embodiments of the invention present/enable/display a graphical user interface that can be used to view the different properties and stages of an asset throughout the asset's lifestyle. One or more exemplary graphical user interface are described below.

Title Summary

The title summary graphical user interface (GUI) page provides a searchable listing of future releases that have been added to the online global planning system. Information that may be displayed in the title summary GUI may be retrieved from a data aggregator 106 (e.g., Foxipedia™) that maintains information regarding all of the titles in a content owner's domain (e.g., all titles in the Fox™ family) including future releases for which production is currently active. Users may specify whether to display titles that are not currently in post-production but have instantiated data maintained in the data aggregator 106. Further, access to information may be limited based on security privileges. Accordingly, certain vendors/users may only be permitted to view particular titles/rows for which specific authorization has been granted.

The title summary GUI may be used to search for a title to review a product plan, to initiate a title to start the planning process, to update title level templates, and/or to add a placeholder title in the global planning system. To search for a title, a user may enter text into various fields that will search corresponding fields in a data aggregator 106 (e.g., a search may be conduct by title, WPR product ID, US release date, etc.). Results of the search/query may be displayed in a grid like structure where each row represents a different title and each column provides a different attribute for the title. Columns may be dragged and dropped as desired (e.g., to rearrange the display in the GUI window), and selection of a column header (e.g., via a click) may resort all entries based on data within that column (e.g., alphabetically).

Title level attributes that may be displayed include:

Title—the movie/film/asset title;

InCopper—an indication regarding whether work for the title has been initiated in Copper™ (e.g., for planning) A drop down box can be used to examine titles for which work has not yet been commenced within Copper™ (e.g., to filter titles are initiated with a planning in progress or all available titles including those not yet initiated yet [e.g., where information for such a title has been retrieved from the data aggregator 106[]);

Security Title—code word determined by ITPP 102 to use while reference the title in email or other correspondence;

WPR Product ID—unique ID identifying the title/asset;

Studio—name of studio;

US Rating—the MPAA rating of the title (e.g., G, PG, PG-13, R, etc.)

US Release date;

First worldwide release date; and

Title Tier—categorization of title with respect to anticipated distribution.

An A-D grade specified by ITTP 102. The title tier may be determined based on a variety of factors including the scale of the release (e.g., how many markets are releasing the film), the level of creative complexity, and the level of technical complexity.

In addition to title level attributes, the title summary grid may also display version level attributes including:

Runtime;

DCP size (GB)—Digital Cinema Package, size in GB of digital copy of asset/title;

Billing Footage—calculated field used for billing purposes;

# of reels;

Dimensions—2D or 3D;

Formats—format of asset (digital, IMAX, 35 mm, etc.)

Ratio—flat, cinemascope, full, etc.

Sound—5.1, 7.1, 6.0 IMAX, Auro, Dolby Atmos, etc.

The Title Summary grid may also include contact information (e.g., for the dubbing and post contact), as well as editing information such as the dates of the last view and last edit.

All of the title summary attributes may be easily sorted by column merely by clicking the column header. Further, based on security (e.g., access privileges of a logged in user), access to a particular media content asset may not be viewable or available for display within the title summary screen. In addition, the user may manually determine which columns/attributes are displayed within a grid (e.g., using checkboxes/radio buttons to select columns from a list of columns).

Further to the above, when managing titles, various templates may be selected and used for various purposes. In this regard, templates relating to the title may be available for selection and applied when a title is first added to the online global planning system 100. A presentation version template contains territory/presentation configuration combinations that may be presented to territories to select from on a presentation tab GUI. A vendor template assigns a default list of vendors that can be applied to a particular title. An Enterprise Operations Localization template may include commonly requested subtitle and dubbed languages required for home entertainment and other downstream media.

Title information for the titles displayed (e.g., all titles or titles selected in a resulting search grid) may also be exported (e.g., to a comma separated value [CSV] file, spreadsheet format file, etc.). Using an export procedure, the particular columns that the user desires to export may also be manually identified/selected.

When conducting a search, if a title cannot be found (e.g., because the WPR Id is not set-up, production status is not correctly set, and/or the title's release dates are in the past), the user may be presented with an option to add a placeholder title to the online global planning system 100. After a subset of information has been added, additional title information/attributes may be automatically retrieved (e.g., from the data aggregator 106).

Title Information

Title information may be used to initiate a title in the online global planning system 100 in order to start the planning process. Within a title information GUI, presentation version templates may be selected, a contact for the title may be specified, and global values for use throughout the title planning process may be specified.

To begin entering such title information, from the title summary GUI, the user may select (e.g., via double clicking) a particular title followed by the selection of an option begin adding the selected title to the online global planning system 100. Thereafter, the user can enter the various attributes for the title including a security title MPAA rating, tier and presentation view template information, contact information (including contact type) and global parameters (e.g., dimensions, brightness, formats, aspect ratio and whether a particular aspect ratio is available, audio format, etc.) that are all specific to the selected title.

Further, or in addition to the above, once a user selects a particular title from the title summary GUI, a tab may open with detailed information regarding the selected title. Additional tabs may also be displayed (and may be available for selection) to perform additional actions. Such tabs include information, product plan, versions, cuts/edits, version plan, presentations, localization tracker, milestones, vendors, and reports. Each tab will be discussed in further detail below.

Information

The Information tab contains high level information that may be populated from the data aggregator 106 (as described above) with edit permissions that may be limited to a defined set of users (e.g., home office personnel/users). Within the information tab, additional information may also be displayed including global parameters (e.g., dimension, brightness, formats, aspect ratio and whether available, sound channel configuration, and checkboxes to indicate availability for each parameters), documents (that allows the upload of documents for authorized users to access for collaboration purposes), etc.

Product Plan

Generally, a product plan identifies language rights and dubbing and subtitle plans for theatrical and enterprise operations as well as the status of such plans. When viewed within a GUI, a product plan is a mechanism for users to see what has been ordered (e.g., what has been localized in each territory) and the current status of dubs/subs that have been requested/ordered. Key functionality of a product plan includes the identification of language rights by territory, an identification of where the rights for a product/media content asset are sourced from (e.g., whether they rights should be populated from an enterprise management system or managed by users [e.g., overriding the system]), an identification of territories with approved theatrical dub and sub presentation views by language, and a display of dubbing and subtitling plans from an enterprise operations input screen (including due dates for when dubbing operations need to be completed to meet enterprise operations requirements).

Archive Versions

As described above, archive versions allow authorized users to create versions of a title (e.g., different cuts of a film/title)(e.g., for different international territories). For example, an archive version may include a 2D original version, a 2D title treatment base package, a 3D original version, a 3D title treatment base package and a 2D UK censorship version. Presentation versions may then be based on the archive versions. For example, from a 2D original version, three different presentation versions may be created, one with no localization, one with French subtitles, and one with English audio description tracks, a hearing impaired track, and closed captions. Similarly, from the 2D title treatment base package archival version, several presentation version may be created (e.g., one version with P. French audio, several inserts, and dub cards, and a second version with Q. French audio, several inserts, main on ends, and dub cards). Similar/additional presentation versions may be created that correspond to each of the archival versions. Each of the versions (archival or presentation) may also be assigned unique identifiers.

As described above, archive versions allow authorized users to create versions of a title (e.g., different cuts of a film/title)(e.g., for different international territories). Details for a particular version may be specified including where it is stored in the Vault 116, a unique version ID, descriptions (e.g., censorship version for China), etc. Legal details regarding the archive version may also be specified. New archival versions may be added by specifying a variety of attribute information for a particular title and/or by using a template.

Referring to FIG. 2, when a title is initiated at 202, a vault request may be made to define the asset at step 218 for storage in the vault 116. A vault request sends archival version metadata to the vault 116 and requests a vault ID for each archival version dimension (2D/3D). In this regard, a user activates a selection for a new archival version, selects a version type, and enters all metadata. For the metadata, description fields allow the user to identify information about the version (e.g., do not show actor Jon Doe smoking a cigar for this India cut). A search for the archival version is conducted and if no results are found, a new ID request may be initiated and returned.

Cuts and Edits

A tab for conducting cuts and edits may be selectable from within the Title Information screen. The cuts and edits tab enables authorized users to identify edits to the film requested by territory users (e.g., due to local ratings and censorship activities), to specify territories who need identical cuts/edits, and to identify the specific location of cuts/edits. FIG. 3 illustrates an exemplary interface for performing the cuts and edits functionality in accordance with one or more embodiments of the invention. Using the GUI 300, an original version is selected in area 302. The user then selects an option using icons 304 to add a cut or insert, delete a cut or insert, or copy and paste a cut or insert. Picture changes requested by territories may then be defined in rows 306. Each row represents a different cut/edit that is performed.

When the user desires to add a new cut/edit, the user selects icon 308 from icons 304 to add a cut or insert. Thereafter, the user can begin describing the cut or insert in area 310.

Windows 312 and 314 may be used to further specify properties for an archival version that contains a cut or edit. In particular, window 308 may be used to identify territories that may share an archival version (e.g., by activating checkboxes adjacent countries). In addition, using drop down box 316 of window 314, the user can specify the time format that will be displayed (e.g., in either time code or frames). The ITPP team 102 may further ensure that the time codes listed for the cuts and edits used for censorship cuts of the film match the edit decision list (EDL)(that reflects that actual edits). In this regard, a territory may provide a list of the censored scenes to a home office ITPP team 102. The ITPP team 102 reviews the cuts and edits and sends them to the KRS system 112 to have the time codes added for each cut. The KRS system 112 returns the cut list with time codes and in response, the ITPP team 102 enters the cuts (with the time codes) into the online global planning system 100 using the GUI of FIG. 3.

Once a cut has been defined, a cut may be selected and the user can then select the various archive version or base packages that the cut will be applied to.

Version Plan

One of the tabs that may appear in the Title Information screen is Version Plan. A version plan allows the user to identify a territory archival version release plan. Key functionality of a version plan include allowing multiple archival versions to be selected for one territory, applying archival versions to a territory and enabling milestone planning, publishing territory plans to pass archival and presentation metadata to KRS 112 and ERP system 114, using a keyboard control (e.g., the Ctrl key) to highlight and select multiple territories with a single click, and identifying territories with assigned cuts to archival versions.

The workflow for developing a version plan includes a home office selecting and publishing an original version for the US territory, the system passing archival version metadata to KRS 112 and ERP system 114, the home office selecting a territory archival release plan to enable milestone planning, a territory office requesting presentation versions, a regional office approving presentation requests, and the home office publishing the territory release plan (e.g., 2-4 weeks prior to release).

Presentation Versions

Presentation versions provide a mechanism for defining localization for a particular territory. As described above, various presentation versions may be created based on an archive version. Accordingly, presentation versions have a child-parent relationship with archival versions. Referring to FIGS. 1 and 2, territory users request the presentation versions (e.g., at 206) that they plan to release. Once requested, a sales team (e.g., part of the ITPP group 102) approves or rejects presentation requests. Approved presentations are used by the ERP system 114 for purchase orders (at 216), by KRS systems 112 for key orders, and by Copper™/online global planning system 100 for milestones (at 220). Territory plans may also be viewed by regional and home office users.

When issuing a request for a presentation, territories may specify various attributes/configurations desired. Such configurations may include a territory a status, dimension, format, brightness, aspect ratio, sound, etc. A territory user may select one or multiple presentations to be approved, specify multiple configurations desired (e.g., for multiple different presentation requests), indicate whether a requested presentation will be released, and may then submit a request.

Once requested, authorized users (e.g., users in a regional and/or home office) may create the requested presentation (even if such a presentation is not typically released in a specific territory). To create the presentation, the authorized user may simply utilize a GUI that permits the user to enter the various parameters for a presentation, and apply/save the results. Such parameters may include the territory, dimensions, format, brightness, aspect ratio, sound, frame rate, dubbing attributes, subtitle/closed caption information, as well as the content type (e.g., whether the version is for a feature or for marketing purposes).

Figure 4:
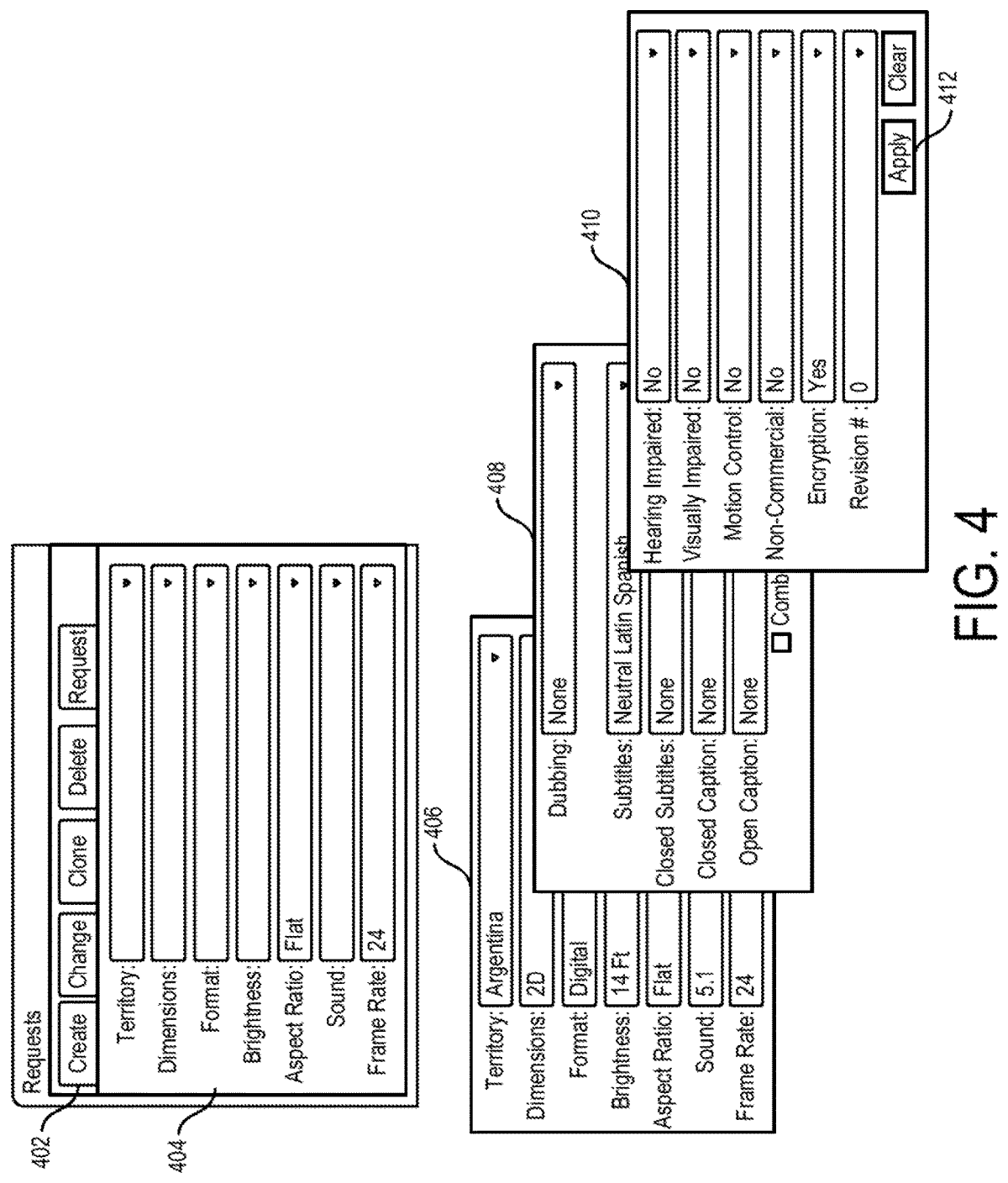

FIG. 4 illustrates an exemplary graphical user interface that may be used to search for/create a presentation in accordance with one or more embodiments of the invention. As illustrated, the user simply selects the create tab 402, enters/selects the appropriate configuration parameters in the fields displayed in windows 404-410, and applies/saves the configuration by selecting icon 412. Accordingly, a user (from a particular territory) can specify a combination of various parameters and search for a particular version. If the version does not exist, the user can then issue a request for such a version. Once requested, a regional office may receive a notification and has the ability to approve/deny the request.

Authorized users have the ability to create, change, or clone one or multiple presentation (for one or more territories), dimensions, ratios, sound, dubbing, and subtitling languages at a time. Further, all actions, including creation, modification, and approval of a presentation may be recorded to provide a viewable audit trail. Such an audit trail may include details regarding which user performed any update/edit on a particular attribute. In addition, authorized users can add a version note to any presentation version (e.g., specifying a reason why a presentation version has been revised, why the presentation version was requested, etc.). The audit trail may be viewable in a GUI that slides in/out of view (e.g., upon selection of a particular view). Alternatively, information about a particular edit may be displayed via a pop-up menu upon hovering/clicking on a field/attribute.

In addition to the above, embodiments of the invention may allow the user to specify an owner of one or more presentation versions. The owner of a particular presentation version may be the primary territory of the dubbed and/or subtitle language but may be changed as desired. For example, a French dubbed and subtitled presentation version may be owned by France but can be changed to Belgium.

Localization Tracker

A localization tracker enables authorized users to identify areas of a title/reel for which localization (for a foreign territory) may be desirable. Users can input information regarding how to handle an event (e.g., dubbing, subtitling, etc.). As an example, when watching a movie, newspapers, signs, menus may be displayed for a specified timeframe (e.g., a sign that says "New York City") (referred to as an "event"). Authorized users have the ability to specify where such events occur in a title/reel so that others (e.g., local territories) can determine whether to request a local presentation version or not. Accordingly, the localization tracker enables authorized users (e.g., home office, regional office, territorial office, and vendors) to input and manage localization events. Features of a localization tracker include the ability to auto-adjust time codes of each event on censorship versions, an audio trail log of all user changes, a visual indicator of when events are eliminated from archival versions, and the ability to generate tracker reports.

To initiate tracking for a title/reel, a template or other file may be uploaded/imported into the global online planning system 100 and associated with a particular archival version. An exemplary format of the tracker template/file is a comma separated value (CSV) file so that the data can be viewed in a spreadsheet or grid type format. Fields in the tracker template file may include an event ID, a start time code and end time code (identifying the time ranges of the event), the type of localization (e.g., main title, narrative title, subtitle, on-screen text, song, main and ends), the original text or lyric of the event, and various optional upload fields (e.g., changes to be made). Once imported, a similar grid type GUI may be displayed for users to further view/edit the localization data.

Once a tracker template/file is uploaded and associated with an archive version, recommendations regarding how to handle the event locally may be entered into the GUI within the online global planning system 100. Such recommendations may include dubbing and subtitle recommendations entered by a home and/or regional office. Various drop down menus may be available for recommending users to select recommendations. Examples of dubbing recommendations may include dub character dialog, dub voiceover, graphic localization, subtitle, territory decision, legal mandate: do not localize, legal mandate: do not subtitle, legal mandate: subtitle, and/or legal mandate: use the original version. Examples of subtitle recommendations may include subtitle, territory decision, and legal mandate: subtitle. Once the recommendations are complete, the recommending user can elect to publish the recommendations thereby indicating the tracker is ready for territories to make localization decisions for the events.

Local/territory users then have the option to order/request localization based on the recommendations. In this regard, a local user can made a decision regarding how to localize an event (based on a recommendation). Localization options/decisions may include dub character dialogue, dub card, dub voiceover/narrator, graphic localization, not applicable/original version, subtitle, etc.

FIG. 5A illustrates a graphical user interface for localizing an event in accordance with one or more embodiments of the invention. As illustrated, the recommendation by a home office is listed in column 502. The decision regarding how to localize the event is set in column 504 by the local user. The translation or other information may be entered by the local user in column 506 and additional comments (e.g., as required to supplement the localization decision and/or translation) may be specified in column 508. Each localization event is represented in a separate row of window 500. Individual events may also be split into multiple entries (e.g., to allow more reading time for an audience). Further, an event may also be respotted where the time code of the event is shifted (e.g., delaying subtitling because the dialogue occurs during the event). Also, multiple events may be merged together by combining multiple events into one event with one set of time codes. All iterations for different localization recommendations/decisions may be tracked and can be compared to each other In an exemplary use case, a user from Germany may make a decision to localize a graphic for a particular event. The tracker may progress through various iterations (e.g., from a preliminary tracking initiated by a user to the final tracking including the final localization), and all of the iterations may be compared to each other to determine the changes made.

Milestones

Milestones are events/actions that are to be/have been performed on one or more titles. Accordingly, a milestones tool within the online global planning system 100 provides the ability to track deliverables, due dates, and other information across a title's life cycle.

Different milestones may have different primary/secondary owners depending on the scenario. For example, the primary owner for a final dubbing reference delivery milestone may be the home office. However, the primary owner for a subtitled translations due milestone may be a territory office. Home and regional office users may be secondary owners to all territory milestones.

Milestones may be triggered by a variety of events including a title initiation, an archival version and territory assignment, a presentation version approval, a dimension, a sound format, and/or dubbing and subtitling localization. In addition, a user may generate user defined milestones that consist of predefined milestones that do not have dependencies (i.e., on other milestones) but will appear in work-in-progress reports.

FIG. 5B illustrates a graphical user interface for filtering and viewing milestones in accordance with one or more embodiments of the invention. The top portion 510 of FIG. 5B provides the ability to filter the milestones that are displayed in area 512. Users can filter milestones by area 514 or type 516 (e.g., dubbing translation, etc.). Territory release milestones may be initiated when a title is created in the online global planning system 100. Other milestones may be initiated based on the occurrence of other events. For example, a sourcing material milestone may be generated when a territory is assigned to a version, a dubbing milestone when a regional office approves a dubbed version, a subtitle milestone when a regional office approves a subtitled version, etc.

To edit a particular milestone, the user can simply select a milestone end date field and enter the date manually or use a calendar function to select a date. If there is a conflict between one or more milestones, a graphical indicator (e.g., a blue or green arrow pointing up or down) may be displayed (e.g., in a conflict column) and indicate whether the conflict is downstream or upstream. Selection of the graphical indicator may open a dependencies window to permit the viewing of any milestones that may be dependent on a particular milestone. An error field may describe any errors incurred due to milestone date conflicts. Adjustments to the day and week of a selected milestone can be made to view the impact on conflicts and the overall schedule. Users may also enter text in a notes field to explain dates, conflicts, or other scheduling highlights.

A user may also have the ability to associate each milestone with an asset identifier that identifies an asset that the milestone relates to. Such an asset identifier may be selected to retrieve/view high level information about the asset (e.g., using a look-up service of the vault 116 where the asset is stored).

Figure 6:
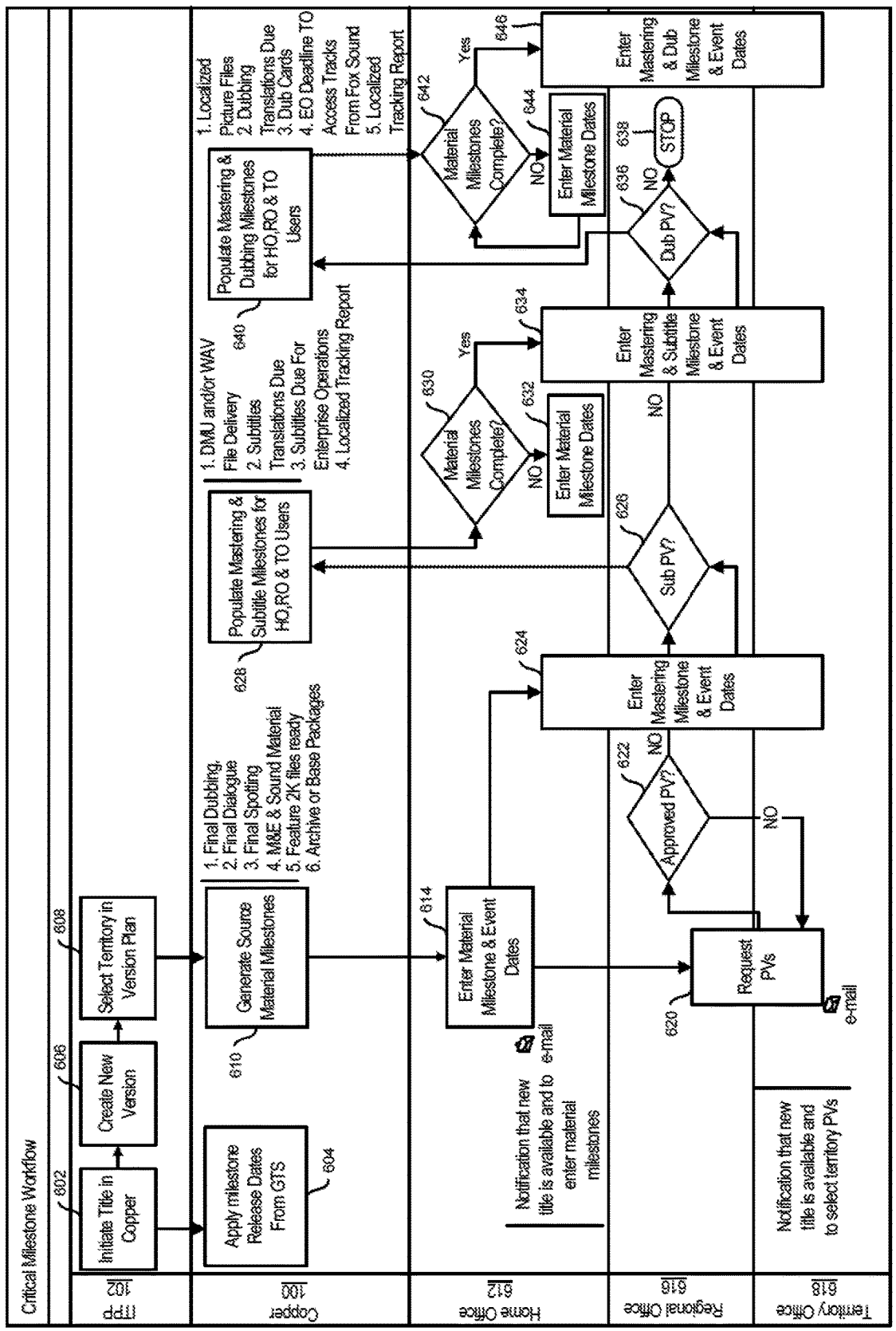
FIG. 6 illustrates the critical milestone workflow in accordance with one or more embodiments of the invention.

FIG. 6 illustrates the critical milestone workflow in accordance with one or more embodiments of the invention. The ITPP group 102 initiates a title in Copper™ 100 at step 602. Once initiated, milestone release dates (defined/input from the global theatrical system 108) may be applied by online global planning system 100 at step 604. After initiating the title, a new version may be created by the ITPP team 102 at step 606 and a territory may be selected in the version plan at step 608.

The online global planning system may generates source material milestones (e.g., final dubbing, final dialogue, final scoring, final fpotting, M&E and sound material, feature 2K files ready, and archive or base packages) at step 610. Once generated, an email notification may be provided to the home office team 612 that the new title is available to enter material milestones. In response, the home office team 612 may enter material milestone event dates at step 614.

The regional office 616 or territory office 618 may then request presentation versions at step 620. To trigger the territory office 618 requesting a presentation version, the territory office 618 may receive a notification (e.g., via email) that a new title is available. The regional office 616 then has the option to approve the presentation version or not at step 622.

Alternatively, or in addition to requesting presentation views at step 620, once material milestone and event dates are entered at step 614, the home office 612, regional office 616 or territory office 618 may enter mastering milestone and event dates at step 624. A determination is then made at step 626 regarding whether a subtitle presentation view has been approved. If a subtitle presentation view has been requested, Copper 100 is used to populate the mastering and subtitle milestones for the HO 612, RO 616, and TO 618 users at step 628. Such a population of data may include due dates/deadlines for DMU (Digital Musician) and/or WAV file delivery, subtitle translations, subtitles for enterprise operations, and a localization tracking report.

A determination is made at step 630 regarding whether the material milestones are complete. If not, material milestone dates are entered at step 632 and the process repeats until the material milestones are complete.

Once material milestones are complete, mastering and subtitle milestones and event completion dates may be entered at step 634. Thereafter, a determination is made if a dub presentation view has been requested. If no dub presentation view has been requested, the process is complete at step 638. If a dub presentation view has been requested, the process continues at step 640 where the mastering and dubbing milestones for HO 612, RO 616, and TO 618 users are entered. Such milestones may include due dates/deadlines for localized picture files, dubbing translations, dub cards, EO deadline to access tracks from sound, and/or a localized tracking report. The home office then determines/loops at step 642 and 644 until the material milestones are complete (for the mastering and dubbing milestones). Once complete, the mastering and dub milestone and event completion dates are entered at step 646.

Vendors

Vendors may be utilized to provide post-production services. The online global planning system 100 can be used to track the services performed by vendors. To track vendor activities, vendors may be provided with access privileges to use various aspects of the online global planning system 100. Vendor access can be assigned based on territory, type, etc. For example, international mastering and localization vendors may have edit access on title level screens (e.g., cuts/edits, localization tracker). Further, the vendor of choice (i.e., the preferred vendor) may be selected/identified within system 100. Vendors may be provided with view only rights to all titles, view only rights to specific titles, edit rights to one or more titles, view access to limited information within a screen, etc.

Reports

Within a selected title, various reports can be produced within the global online planning system 100. A user has an option to select a type of report (e.g., HO Recommendations, Localization by Event, Localization by Territory, Milestones, Presentation Versions, and Title Tech Data). Once a report type has been selected, various parameters may be defined/selected to filter the result set displayed in the report. For example, report filter parameters may include area (e.g., dubbing, subtitle, mastering, etc.), milestones (e.g., all or a subset), region, territory, language, archive versions, etc. Available reports may include:

Home Office Recommendations—on how territories should localize events on a localization tracker);

Legal—legal sends contracts out to talent that will due the dubbing and a legal report indicates territories that need a dub, an identification of the dubbing studio, and/or information regarding the contract of the dubbing studio;

Localization be event—review territory localization decisions by event;

Localization by Territory—Review Territory Localization decisions on the dubbed and/or subtitled tracker;

Localization Completion Status—Shows events by territory, language, and whether it is completed so that archive group can track versions and/or local territory to perform any necessary actions;

Milestones—Review milestones for various areas (i.e.: Dubbing, Subtitle, Mastering) for deliverables and due dates for the presentation versions;

An export of milestones by area;

Presentation Versions—Review all the presentation versions and approval status for the territories;

TDR—Review title/logo information and key dates. Used to determine what has been delivered and high level information. TDR report can also be run for all titles from a report tab; and Title Tech Data—Review high level technical data for the title (e.g., reels, summary, cast, frames and billing footage information).

Notifications

Various notifications may be delivered to one or more users based on the occurrence of one or more events. Such notifications may be customized based on various attributes/ user information. For example, weekly and daily notifications may be provided and may be unique for each receiving vendor. In this regard, notifications may be limited to the titles, territories, and languages that the vendors are assigned to. Such notifications may provide updates regarding when titles are added or updated, when archival versions are added/updated, when a localization tracker is updated, when enterprise operations has received an update, when milestones are added, changed, completed, etc.

Hardware Environment

Figure 7:
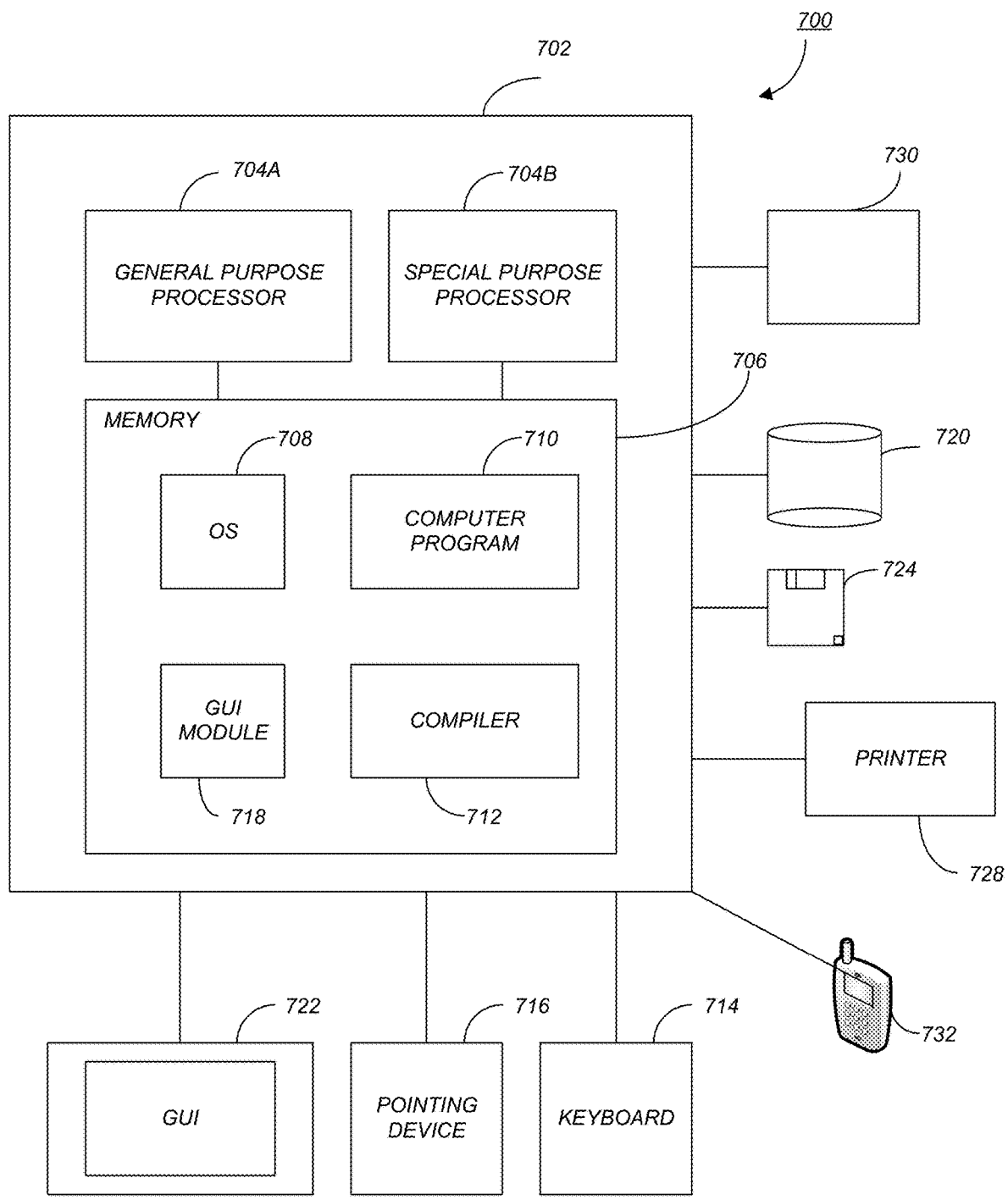
FIG. 7 is an exemplary hardware and software environment used to implement one or more embodiments of the invention.

FIG. 7 is an exemplary hardware and software environment 700 used to implement one or more embodiments of the invention. The hardware and software environment includes a computer 702 and may include peripherals. Computer 702 may be a user/client computer, server computer, or may be a database computer. The computer 702 comprises a general purpose hardware processor 704A and/ or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening device 732 (e.g., an MP3 player, iPod™, Nook™, portable digital video player, cellular device, personal digital assistant, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the general purpose processor 704A performing instructions defined by the computer program 710 under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a graphical user interface (GUI) module 718. Although the GUI module 718 is depicted as a separate module, the instructions performing the GUI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/ video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, the some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as COBOL, Pascal, C++, FORTRAN, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
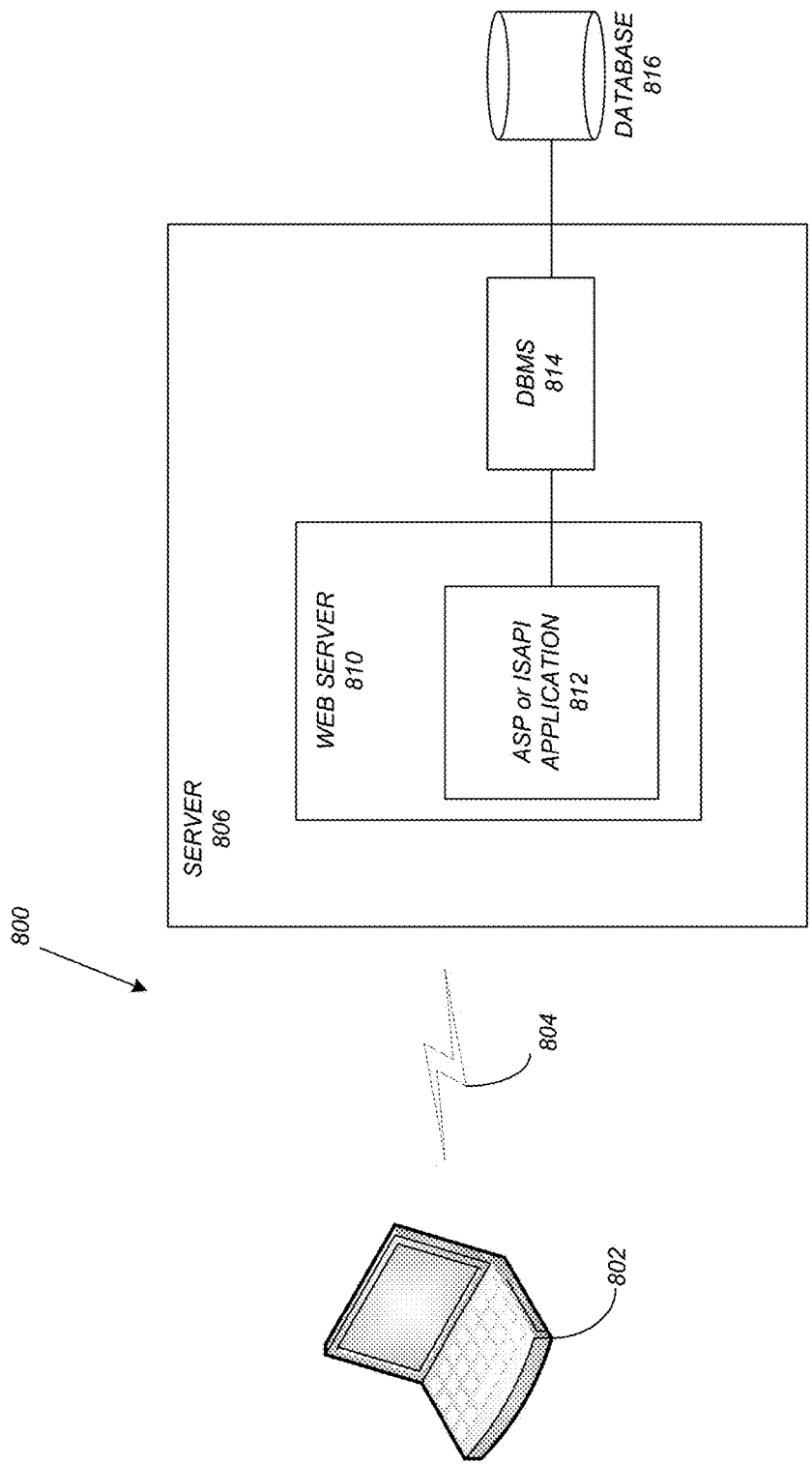
FIG. 8 schematically illustrates a typical distributed computer system using a network to connect client computers to server computers in accordance with one or more embodiments of the invention.

FIG. 8 schematically illustrates a typical distributed computer system 800 using a network 804 to connect client computers 802 to server computers 806. A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize ethernet, coaxial cable, wireless communications, radio frequency (RF), etc. to connect and provide the communication between clients 802 and servers 806. Clients 802 may execute a client application or web browser and communicate with server computers 806 executing web servers 810. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 802 may be downloaded from server computer 806 to client computers 802 and installed as a plug-in or ACTIVEX™ control of a web browser. Accordingly, clients 802 may utilize ACTIVEX™ components/component object model (COM) or distributed COM (DCOM) components to provide a user interface on a display of client 802. The web server 810 is typically a program such as MICROSOFT'S INTERNET INFORMATION SERVER™.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 may be part of, or connected directly to, client 802 instead of communicating/obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S™ Transaction Server (MTS) to access required data stored in database 816 via an interface such as ADO (Active Data Objects), OLE DB (Object Linking and Embedding DataBase), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 802 and 806.

Logical Flow

Figure 9:
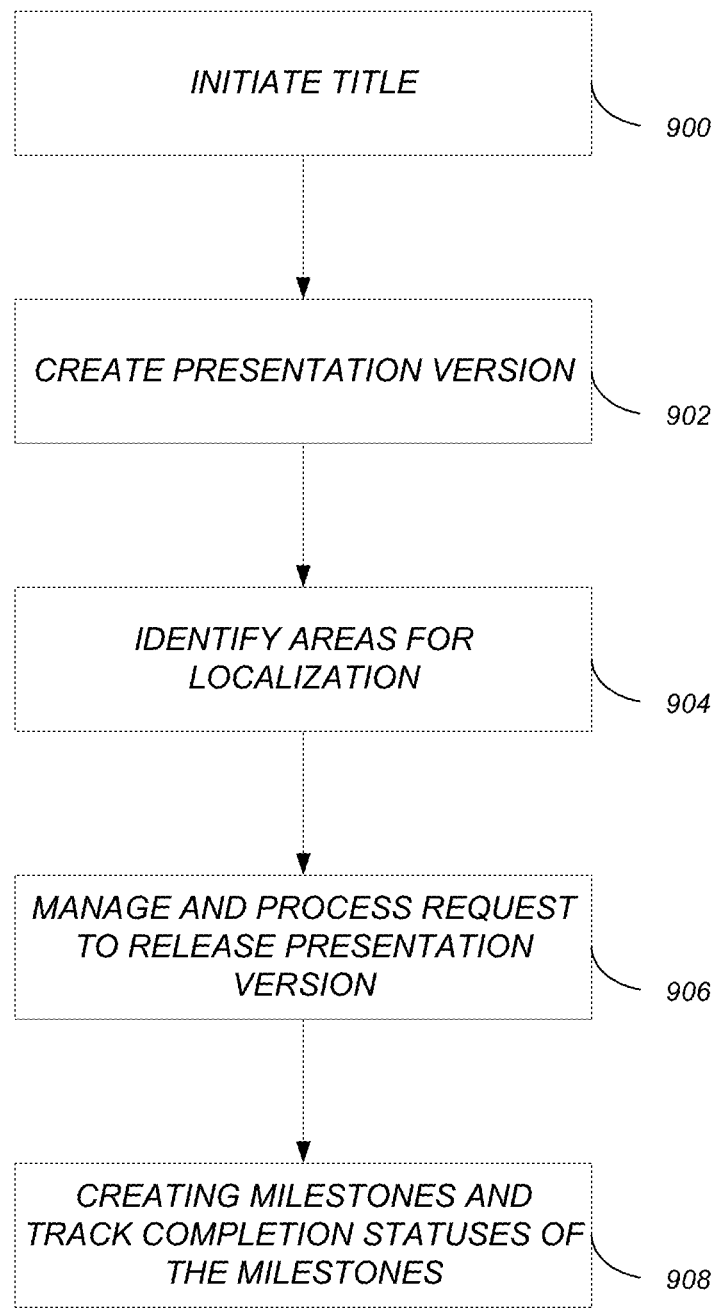
FIG. 9 illustrates the logical flow for tracking a theatrical media content asset in post-production in accordance with one or more embodiments of the invention.

FIG. 9 illustrates the logical flow for tracking a theatrical media content asset in post-production in accordance with one or more embodiments of the invention.

At step 902, a title for the theatrical media content asset is initiated in an online global planning system. Each of the archival versions represents a cut of the theatrical media content asset that is stored in a vault. The initiating is performed by creating one or more archival versions in the online global planning system. Further, the initiating may include defining archival metadata for each of the archival versions. Such archival metadata includes information about the theatrical media content asset including a release date. Additional metadata may include a product identifier, a title, a security title, a studio, production information, a life cycle status, a texted language, a synopsis, and an MPAA rating. Optional additional metadata may also include an archive version name, an archive version description, an aspect ratio, a frame rate, a runtime, a dimension, a resolution, a brightness level, a DCP size, and/or a color. The archival metadata may also be imported from an enterprise wide data aggregator (e.g., Foxipedia™) that maintains information about numerous media content assets.

At step 904, a presentation version that is based on a single unique archival version of the one or more archival versions is created. The presentation version represents a localized version of the single unique archival version. The localized version may consist of a dub or subtitle version of the single unique archival version in a specified territory and language and/or may represent a unique combination of multiple film formatting parameters. Further, the presentation version may define/include presentation metadata such as a presentation version ID, a dubbed language, a subtitle language, and a territory. Further presentation metadata may include a caption language, a hearing impaired feature, a visually impaired feature, an encryption flag, an archive version name, an aspect ratio, a runtime, a dimension, a resolution, a brightness level, and/or a territory. Part of the creation process may include configuring filter parameter(s) to view a listing of multiple media content assets that have been initiated followed by the selection of the theatrical media content asset from the listing (for which the user desires to base a presentation version). Within the global online planning system, access to the archival versions and the presentation version may be limited based on security privileges of a user.

At step 906, for the single unique archival version, one or more areas of the single unique archival version that are required for localization to create the presentation version are identified (e.g., by defining cuts and edits applied to the single unique archival version). Such a step may also include selection of the single unique archival version followed by the display of a master list of all the cuts and edits that are applied to create the presentation version.

Such an identification of areas may include receiving an upload of localization events (e.g., from a vendor), receiving localization recommendations (for the localization events) from one or more first users (e.g., home office users), followed by the ability to receive localization decisions (regarding the localization recommendations) from one or more second users (e.g., regional offices, territory offices, and/or vendors). The localization decisions may include an input localization decision, an input translation, and an input comment. In addition, an audit trail log for all user changes that are performed may be maintained. Further, a graphical user interface (e.g., used by an enterprise operations team) may provide the ability to select an option for dubbing and subtitling localization for Enterprise operations. Such an option may enable the assignment of the territory and language of the Enterprise Operations team to the unique archival version.

At step 908, one or more requests to release the presentation version are managed and processed.

Various steps may be performed to create and or manage the archival versions, presentation versions, and a release plan for such versions (referred to as a version plan). Accordingly, the performance of such steps may also include the selection of multiple archival versions followed by the assignment of the selected multiple archival versions to a territory. Based on the assigning, archival metadata and presentation metadata may be created. Further, also based on the assigning, the archival metadata and the presentation metadata may be passed to a key request system that creates keys and an enterprise resource planning (ERP) system that issues purchase orders against the one or more archival versions and the presentation version. Requests to release the presentation version are received (e.g., from a territory office). The requests to release the presentation version are approved (e.g., by a regional office). The territory release plan that describes release dates for the one or more archival versions and the presentation version is then published (e.g., by a home office).

At step 910, one or more milestones are created and the completion statuses (of the one or more milestones) are tracked. Each of the milestones represents one or more events that are or have been performed on the title. Such events may include the initiating of the title, an assigning of a territory to the one or more archival versions, an approving of the presentation version, a dimension, a sound format, and a dubbing and subtitling localization. In addition, conflicts between the one or more milestones may be managed by displaying errors incurred due to milestone date conflicts, and the adjusting of completion dates (of the milestones) to determine an impact of the adjusting on the conflicts. Step 910 may also include managing and tracking asset delivery against the milestones (e.g., by assigning an asset ID on milestones that track deliverables). Such milestones may also be displayed in a calendar view.

Further to the above, steps 902-910 may also include the generating of one or more reports (e.g., an archive version report, a presentation version report, a milestone report, and/or a localization report). Users may select which report to generate from a list of reports.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for tracking a theatrical media content asset in post-production, comprising:

initiating a title for the theatrical media content asset in an online global planning system by creating one or more archival versions in the online global planning system, wherein each of the one or more archival versions represents a cut of the theatrical media content asset that is stored in a vault, wherein the online global planning system tracks the theatrical media content asset in post-production;

creating a presentation version that is based on a single unique archival version of the one or more archival versions, wherein the presentation version represents a localized version of the single unique archival version wherein the localized version comprises a dub or subtitle version of the single unique archival version in a specified territory and language;

for the single unique archival version, identifying one or more areas of the single unique archival version that are required for localization to create the presentation version;

managing and processing one or more requests to release the presentation version;

selecting multiple archival versions from the one or more archival versions;

assigning the selected multiple archival versions to a territory;

based on the assigning, creating archival metadata and presentation metadata;

based on the assigning, passing the archival metadata and the presentation metadata to a key request system that creates keys and an enterprise resource planning (ERP)

system that issues purchase orders against the one or more archival versions and the presentation version;
receiving the one or more requests to release the presentation version;
approving the one or more requests to release the presentation version;
publishing a territory release plan that describes release dates for the one or more archival versions and the presentation version; and
creating one or more milestones and tracking completion statuses of the one or more milestones, wherein each of the one or more milestones represents one or more events that are or have been performed on the title.

2. The computer-implemented method of claim 1, wherein the initiating comprises:
defining archival metadata for each of the one or more archival versions, wherein the archival metadata comprises information about the theatrical media content asset including a release date.

3. The computer-implemented method of claim 2, wherein the archival metadata further comprises:
a product identifier;
a title;
a security title;
a studio;
production information;
a life cycle status;
a texted language;
a synopsis; and
an MPAA rating.

4. The computer-implemented method of claim 2, wherein the archival metadata is imported from an enterprise wide data aggregator that maintains information about numerous media content assets.

5. The computer-implemented method of claim 1, further comprising:
configuring one or more filter parameters to view a listing of multiple media content assets that have been initiated in the online global planning system; and
selecting the theatrical media content asset from the listing.

6. The computer-implemented method of claim 1, wherein the localized version represents a unique combination of multiple film formatting parameters.

7. The computer-implemented method of claim 1, wherein the presentation version comprises presentation metadata comprising:
a presentation version ID;
a dubbed language;
a subtitle language; and
a territory.

8. The computer-implemented method of claim 1, further comprising:
limiting access to the one or more archival versions and the presentation version based on security privileges of a user.

9. The computer-implemented method of claim 1, wherein the identifying the one or more areas of the single unique archival version comprise defining cuts and edits applied to the single unique archival version.

10. The computer-implemented method of claim 9, further comprising:
selecting the single unique archival version;
displaying a master list of all the cuts and edits that are applied to create the presentation version.

11. The computer-implemented method of claim 1, further comprising maintaining an audit trail log for all user changes that are performed.

12. The computer-implemented method of claim 1, wherein the identifying the one or more areas of the single unique archive version that are required for localization comprises:
receiving an upload of localization events from a vendor;
receiving localization recommendations from one or more first users for the localization events; and
receiving localization decisions regarding the localization recommendations from one or more second users.

13. The computer-implemented method of claim 12, wherein the localization decisions comprise:
an input localization decision;
an input translation; and
an input comment.

14. The computer-implemented method of claim 1, wherein the identifying the one or more areas of the single unique archival version comprises:
selecting an option for dubbing and subtitling localization for Enterprise Operations; and
assigning a territory and language associated with an Enterprise Operations group to the single unique archival version.

15. The computer-implemented method of claim 1, wherein the one or more events comprise:
the initiating of the title;
an assigning of a territory to the one or more archival versions;
an approving of the presentation version;
a dimension;
a sound format; and
a dubbing and subtitling localization.

16. The computer-implemented method of claim 1, further comprising:
managing conflicts between the one or more milestones by:
displaying one or more errors incurred due to milestone date conflicts; and
adjusting one or more completion dates of the one or more milestones to determine an impact of the adjusting on the conflicts.

17. The computer-implemented method of claim 1, further comprising managing and tracking asset delivery against the one or more milestones by assigning an asset ID on milestones that track deliverables.

18. The computer-implemented method of claim 1, further comprising displaying the one or more milestones in a calendar view.

19. The computer-implemented method of claim 1, further comprising generating one or more reports selected from a group consisting of an archive version report, a presentation version report, a milestone report, and a localization report.

20. An online global planning system for tracking a theatrical media content asset in post-production comprising:
(a) a computer having a memory;
(b) an application executing on the computer, wherein the application
(1) provides an online collaboration tool for product planning and enterprise resources, wherein the online collaboration tool tracks the theatrical media content asset in post-production;
(2) initiates a title for the theatrical media content asset by creating one or more archival versions, wherein each of the one or more archival versions represents a cut of the theatrical media content asset that is stored in a vault;

(3) creates a presentation version that is based on a single unique archival version of the one or more archival versions, wherein the presentation version represents a localized version of the single unique archival version wherein the localized version comprises a dub or subtitle version of the single unique archival version in a specified territory and language;

(4) for the single unique archival version, identifies one or more areas of the single unique archival version that are required for localization to create the presentation version;

(5) manages and processes one or more requests to release the presentation version;

(6) selects multiple archival versions from the one or more archival versions;

(7) assigns the selected multiple archival versions to a territory;

(8) based on the assigning, creates archival metadata and presentation metadata;

(9) based on the assigning, passes the archival metadata and the presentation metadata to a key request system that creates keys and an enterprise resource planning (ERP) system that issues purchase orders against the one or more archival versions and the presentation version;

(10) receives the one or more requests to release the presentation version;

(11) approves the one or more requests to release the presentation version;

(12) publishes a territory release plan that describes release dates for the one or more archival versions and the presentation version; and

(13) creates one or more milestones and track completion statuses of the one or more milestones, wherein each of the one or more milestones represents one or more events that are or have been performed on the title.

* * * * *